United States Patent [19]
Adelsberg et al.

[11] 3,833,385

[45] Sept. 3, 1974

[54] PREFORM CORE BODIES

[75] Inventors: Lee M. Adelsberg, Big Flats; Michael C. Carson, Corning; Ray B. Forker, Jr., Beaver Dams; Hermann L. Rittler, Horseheads, all of N.Y.

[73] Assignee: Corning Glass Works, Corning, N.Y.

[22] Filed: Dec. 28, 1971

[21] Appl. No.: 213,223

[52] U.S. Cl................ 106/38.9, 106/39.6, 106/52, 264/63
[51] Int. Cl............................................. B28b 7/34
[58] Field of Search............ 106/38.27, 38.9, 38.35, 106/39 DV, 52; 264/63

[56] References Cited
UNITED STATES PATENTS

| | | | |
|---|---|---|---|
| 3,232,771 | 2/1966 | Pearce | 106/38.35 |
| 3,234,308 | 2/1966 | Herrmann | 264/63 |
| 3,236,662 | 2/1966 | MacDowell | 106/39 DV |
| 3,330,892 | 7/1967 | Herrmann | 264/63 |

FOREIGN PATENTS OR APPLICATIONS

| | | | |
|---|---|---|---|
| 4,519,576 | 4/1970 | Japan | 106/38.27 |

*Primary Examiner*—Helen M. McCarthy
*Attorney, Agent, or Firm*—Clinton S. Janes, Jr.; Clarence R. Patty, Jr.

[57] ABSTRACT

This invention relates to the production of preform core materials which are sufficiently refractory to withstand exposure to temperatures up to and in excess of 1,600°C. and which are relatively inert to such molten metals as nickel and cobalt base superalloys. These core materials are characterized as containing pollucite ($Cs_2O-Al_2O_3-4SiO_2$) and/or mullite ($3Al_2O_3-2SiO_2$).

2 Claims, No Drawings

PREFORM CORE BODIES

Preform cores comprise the interior molds employed in the making of hollow metal castings such as, for example, jet engine blades and vanes. In order to be suitable for such applications, the preform core must exhibit certain chemical and physical attributes. First, adequate strength (modulus of rupture of at least about 2,000 psi) to withstand wax injection and other handling procedures. Second, sufficient refractoriness to withstand contact with molten metal at temperatures of up to 1,600°C. and, sometimes, greater. Third, chemical inertness to molten metal so as to permit the casting of bodies free from defects. Fourth, be readily removable from the casting through leaching with non-acid solutions since acid-type materials commonly attack the metal castings. Of course, where the castings are relatively inert to the action of acids, such solutions could be considered as practical in the leaching process. A fifth physical property which comprises a preferred embodiment of this invention is a coefficient of thermal expansion ranging between about 30–60 × $10^{-7}$/°C. to assure compatibility with the outer mold material and the cobalt and/or nickel based superalloys for which the present materials are designed to have special utility therefor.

For many years, the most widely used core material for metal castings has been sand, i.e., silica. Nevertheless, as metals and alloys were developed which required higher and higher temperatures for melting, the silica cores appeared to react somewhat with the alloys and could not retain their integrity so various refractory materials, e.g., zircon and alumina, were blended therewith in an attempt to raise the useful working temperature thereof. However, such cores, being mechanically weak, were subject to breakage in the wax injection molding steps and other handling and to physical disintegration due to thermal instability. Furthermore, the added refractory materials also frequently demonstrated reaction with the molten metals at the extreme elevated temperatures demanded for casting.

Therefore, the principal objective of the instant invention is to provide preform cores which not only possess the inherent strength to resist the above-described mechanical breakage and the necessary refractoriness to avoid the said physical disintegration, but which also will be chemically inert to molten metals at the extreme temperatures required for their casting and be readily leachable by non-acid materials.

United States Application Ser. No. 212,952, now U.S. Pat. No. 3,723,140, filed concurrently with the present application in the names of George H. Beall and Hermann L. Rittler, describes the production of glass-ceramic materials wherein the crystal phase consists essentially of pollucite solid solution crystals with, optionally, mullite crystals. Thus, that application discloses the heat treating of glass articles consisting essentially, by weight, of $Cs_2O > 15\%$ but $< 40\%$, $Al_2O_3 > 10\%$ but $< 55\%$, and $SiO_2 > 25\%$ but $< 75\%$, so as to cause the crystallization in situ of the glass articles to bodies containing at least 50% by volume crystals. These crystallized bodies are extremely refractory, e.g., exhibiting an annealing point of 1,416°C. as compared to 1,082°C. for fused silica.

United States Application Serial No. 212,985, now U.S. Pat. No. 3,726,695, filed concurrently with the present application in the names of George H. Beall and Hermann L. Rittler, sets forth the manufacture of glass-ceramic materials wherein the crystal phase consists essentially of mullite crystals. Thus, that application describes the heat treating of glass articles consisting essentially of, by weight, $Cs_2O > 4\%$ but $< 15\%$, $Al_2O_3 > 15\%$ but $< 35\%$, and $SiO_2 > 35\%$ but $< 80\%$ $SiO_2$, so as to cause the crystallization in situ of the glass articles to bodies containing at least 25 percent by volume crystals. These crystallized bodies are relatively refractory, e.g., exhibiting an annealing point of 1,000°C. as compared with 1,082°C. for fused silica.

Each of the above-described materials has been found suitable for use in the instant invention. Further information concerning the characteristics of those materials plus the method for making them can be secured through an examination of the two specifications and such information is incorporated herein by reference.

The production of sintered bodies of the mineral pollucite (classic formula $Cs_2O\text{-}Al_2O_3\text{-}4SiO_2$) has been known to the art but volatilization of cesia ($Cs_2O$) during the firing step resulted in inconsistent sintering behavior and unsatisfactory reproducibility of the product. Nevertheless, those sintered bodies demonstrated high refractoriness and a relatively low coefficient of thermal expansion. Such desirable characteristics suggested the possible utility of pollucite as an ingredient in batches designed for the preparation of preform cores.

The present invention is founded upon the discovery that preform cores exhibiting very high refractoriness, good compatibility with molten metals and alloys at very high temperatures, and relatively rapid leachability in non-acid materials can be produced from batches consisting essentially of pollucite mineral and/or the $Cs_2O$-containing glass-ceramic of the two patent applications referred to above with, preferably, at least a minor amount of a material consisting essentially, if not wholly, of silica ($SiO_2$) to expedite leaching. Hence, the instant invention contemplates the formation of preform cores from the following alternative batches:

1. pollucite mineral;
2. the pollucite-containing glass-ceramic material noted above, this latter component being present in the glass state and/or in the crystallized state;
3. the mullite-containing glass-ceramic material noted above, this latter component being present in the glass state and/or in the crystallized state; and
4. any combination of the above three alternatives. In the preferred embodiment of the invention, a highly siliceous material and, most desirably, a completely siliceous material such as fused quartz or fused silica will be included in each of the above four alternative batches.

Reduced to the most simple terms, the preform cores of the preferred embodiment of the invention utilize fused quartz or fused silica to insure rapid leachability. The base ingredients provide higher refractoriness than is attainable with the silica material alone as well as excellent hot metal compatibility and improved thermal stability. It has been found that the siliceous material should preferably be essentially completely $SiO_2$, i.e., at least about 90 percent $SiO_2$, to avoid impurities which might react with the metal and/or severely lower the refractoriness of the preform core. For example, 96 percent silica glass has proved to be a satisfactory substitute for fused quartz or fused silica with regard to inertness to metal and ease of leachability, but the overall refractoriness of the core is reduced somewhat such as to preclude its use in very high temperature applications.

The basic steps in the method of making preform cores are three. The batch materials in comminuted form are mixed together and uniformly dispersed in a liquid with, if desired, a deflocculant and binder. Thereafter, the wetted batch is shaped into a body of the proper configuration. Finally, the body is fired to sinter and densify the body. Thus, the batches contemplated in the present invention are capable of being utilized in any of the well-known molding techniques such as pressing, injection, extruding, slip casting, rolling, spinning, etc. However, in the production of preform cores, the molding practice outlined in U.S. Pat. No. 3,330,892 is particularly useful with the materials of the instant invention and, as such, constitutes the preferred forming method therefor.

In that patent the process steps described are five. First, the batch ingredients are dispersed in a fluid organic vehicle together with an organic deflocculant and binder. Second, the fluid batch mixture is molded into a desired shape. Third, the shaped mixture is hardened to a relatively rigid green body. Fourth, the organic vehicle is sublimed out of the body. Fifth, the green body is fired to sinter and densify it into a strongly coherent article.

The unique feature of that patented invention is the selection of the organic vehicle. Thus, the vehicle is a solid at room temperature but will be rendered fluid at relatively low elevated temperatures, viz., below 200°C., and which has a vapor pressure of at least 1 mm. Hg at its melting point under normal ambient atmospheric pressure. In practice, the batch ingredients plus the vehicle are heated sufficiently to bring the vehicle to suitable fluidity to impart the necessary moldable consistency to the batch mixture for the contemplated molding technique. After the batch has been molded to the desired shape, it is re-solidified by cooling back to no lower than room temperature. The thereby rigidified body is then heated to an elevated temperature, but below the melting point of the vehicle, to cause the rapid sublimation thereof from the body as a result of the high solid state vapor pressure exhibited by the vehicle.

Further information relating to the practice of that invention can be garnered through a study of U.S. Pat. No. 3,330,892 and such information is incorporated herein by reference.

The degree of comminution and the particle size distribution of the silica material, pollucite mineral, and/or other inorganic batch materials are those normally employed in the making of preform cores. In general, the maximum particle size will not exceed about 100 Tyler mesh (149 microns) and, preferably, will be finer than 325 Tyler mesh (44 microns). However, the operability of this invention is not tied to any particular fineness of particles. The only criterion is that the size and particle distribution are such as to yield dense, coherent sintered structures.

In the broadest terms, the present invention involves the production of preform cores consisting essentially of at least one of the above-described $Cs_2O$-containing materials with, preferably, the addition of silica. Hence, the mullite and/or pollucite-containing material and, optionally, silica are comminuted to the proper size and particle distribution required for the production of preform cores and then dispersed within a liquid vehicle to yield a mixture having the necessary consistency for forming preform cores of desired configuration. Thereafter, the mixture is shaped and the green body subsequently fired (commonly at about 1,100°–1,600°C.) to sinter it into a dense, coherent article.

In general, at least 10 percent by weight of the highly siliceous material in the product has been found necessary to insure rapid leachability, but more than about 80 percent by weight has led to excessive shrinkage during sintering and substantially reduced refractoriness in the final product. Hence, preform cores exhibiting the preferred characteristics of extreme refractoriness coupled with rapid leachability can be secured from products consisting essentially, by weight, of 10–80 percent of highly siliceous material and 20–90 percent of at least one additive selected from the group consisting of pollucite mineral, a glass and/or glass-ceramic material consisting essentially, by weight, of >15% but <40% $Cs_2O$, >10% but <55% $Al_2O_3$, and >25% but <75% $SiO_2$, and a glass and/or glass-ceramic material consisting essentially, by weight, of >4% but <15% $Cs_2O$, >15% but <35% $Al_2O_3$, and >35% but <80% $SiO_2$.

It will be appreciated that the highest refractoriness will be observed when the $Cs_2O$-containing material is utilized alone as the preform core. However, as will be demonstrated below, these materials and, particularly, the $Cs_2O$-containing glass-ceramic materials are leached comparatively slowly in non-acid media. The addition of the fused quartz or silica greatly expedites the leaching step and, therefore, except where the highest refractoriness is demanded, these will be included in the batch to make the process more attractive commercially. Nevertheless, for good quality castings, the total fired shrinkage of the core will not exceed about 3 percent, it being recognized that, in general, higher temperature sintering will yield a stronger body.

Inasmuch as the preferred method for forming the preform cores of the present invention employs the practice disclosed in U.S. Pat. No. 3,330,892 because of the complexity of shape required for such applications as the making of hollow metal castings for jet engine blades and vanes, the working examples set out below utilize that practice although it must be understood that those examples are illustrative of method only and should not be deemed limiting. In each example, the ceramic materials were ballmilled to pass a 100 Tyler mesh screen, paradichlorobenzene comprised the organic vehicle, fish oil was the organic deflocculant, and Carbowax 20M constituted the organic binder. Carbowax 20M is a water-soluble, waxy solid polyethylene glycol having an average molecular weight of about 20,000 and being insoluble in melted paradichlorobenzene. The vehicle was melted and the other components added with stirring while the mixture was held at 90°–100°C. After stirring for 15 minutes, the mixture was formed into core shapes by transfer molding. The green core shapes were "dried" at 40°C. until substantially all of the paradichlorobenzene had been sublimed and then fired at various temperatures to sinter to a dense, coherent structure.

EXAMPLE I

The Batch Composition

| Component | Weight in Grams | Percent by Volume | Density g/cc | Vol. cc. |
| --- | --- | --- | --- | --- |
| Pollucite Mineral | 384 | 12 | 3.2 | 120 |
| Fused Silica | 1150 | 48 | 2.4 | 480 |
| Paradichlorobenzene | 437 | 30 | 1.46 | 300 |
| Carbowax 20M | 96 | 8 | 1.2 | 80 |
| Fish Oil | 19 | 2 | 0.92 | 20 |

The cores were fired for 2–8 hours at temperatures between about 1,200°–1,500°C. to yield bodies having strengths ranging between about 500–2,500 psi and linear shrinkages varying between about 2–5 percent, the higher strengths and shrinkages being obtained at the higher sintering temperatures. After firing, the body consisted essentially, by weight, of about 20 percent pollucite mineral and 80 percent fused silica. The coefficient of thermal expansion was measured as 35 × $10^{-7}$/°C. (25°–1,000°C.).

As a test of the refractoriness of this material, cobalt-based superalloy castings were made on these cores, the pourings being undertaken at 1,500°C. and 1,600°C. This alloy has a coefficient of thermal expansion of about 181.6 × $10^{-7}$/°C. (0°–1093°C.) and the approximate composition listed below in weight percent

| Cr | 21.3% |
| --- | --- |
| Ni | 10.0 |
| W | 6.8 |
| Ta | 3.5 |
| C | 0.55 |
| Zr | 0.48 |
| Ti | 0.19 |
| Co | 57.5 |

Incipient melting and slumping of the cores were observed after the 1,600°C. pouring, indicating marginal utility at that temperature. No evidence of temperature failure was noticed after the 1,500°C. pouring, however. In neither case was any reaction observed as having taken place between the alloy and the core material. The core material was completely removed from the casting after a static immersion in molten NaOH at 950°F. for 30 minutes.

Although this example illustrates the rapid leaching imparted to the cores through the presence of fused silica therein, it further indicates the low strength and high shrinkage concomitant with very high proportions of fused silica. Such a product might prove useful with careful handling and where speed of leaching was deemed of paramount importance. Nevertheless, as the following examples will demonstrate, lower proportions of fused silica will produce cores having better overall properties.

Example II

The Batch Composition

| Component | Weight in Grams | Percent by Volume | Density g/cc. | Vol. cc. |
| --- | --- | --- | --- | --- |
| Pollucite Mineral | 536 | 27.3 | 3.2 | 168 |
| Pollucite Glass-Ceramic* | 536 | 34.6 | 2.5 | 215 |
| Paradichlorobenzene | 247 | 27.2 | 1.46 | 169 |
| Carbowax 20M | 71 | 9.5 | 1.20 | 59 |
| Fish Oil | 10 | 1.8 | 0.92 | 11 |

*A glass-ceramic material prepared in accordance with United States Application Serial No. 212,952, supra, wherein the crystal phase consists essentially of pollucite with a minor amount of mullite made through the crystallization *in situ* of a glass consisting essentially, by weight, of 25 % $Cs_2O$, 39.8% $Al_2O_3$, and 35.2% $SiO_2$.

Cores made from that batch were fired according to the schedule: 166°C./hour to 1,000°C.; 50°C./hour to 1,300°C.; and held for 8 hours to yield composition consisting essentially, by weight, of 50 percent pollucite mineral and 50 percent pollucite glass-ceramic at 1,300°C. The strengths of the sintered cores averaged about 3,200 psi with shrinkages averaging about 0.3 percent. Castings of the same cobalt-based superalloy employed in Example I at a temperature of 1,600°C. manifested no chemical or physical attack. The coefficient of thermal expansion of the core material was determined as 40 × $10^{-7}$/°C. (25°–1,000°C.).

Therefore, as far as refractoriness, strength, coefficient of thermal expansion, and metal compatibility are concerned, this core composition is excellent. However, complete leaching of the core material required somewhat more than 24 hours of static immersion in molten NaOH at 950°F. It is quite apparent that a reduction in this time for leaching would be very desirable in commercial applications.

Example III

The Batch Composition

| Component | Weight in Grams | Percent by Volume | Density g/cc. | Vol. cc. |
| --- | --- | --- | --- | --- |
| Pollucite Mineral | 1920 | 60 | 2.9 | 600 |
| Paradichlorobenzene | 437 | 30 | 1.46 | 300 |
| Carbowax 20M | 96 | 8 | 1.2 | 80 |
| Fish Oil | 19 | 2 | 0.92 | 20 |

Cores made from that batch were fired at the rate of 300°C./hour to 1,160°C. and held at that temperature for 8 hours, thereby producing a body consisting essentially of sintered pollucite mineral exhibiting a coefficient of thermal expansion of about 31.6 × $10^{-7}$/°C. (25°–1,000°C.). The modulus of rupture of the cores averaged about 2,940 psi and the average shrinkage was about 2.9 percent. After pouring the same cobalt-based superalloy as that used in Example I at 1,600°C., no chemical or physical attack was detected. However complete removal of the core material was only accomplished after about 20 hours of static immersion in molten NaOh at 950°F.

EXAMPLE IV

The Batch Composition

| Component | Weight in Grams | Percent by Volume | Density g/cc. | Vol. cc. |
| --- | --- | --- | --- | --- |
| Pollucite Glass-Ceramic* | 1780 | 60 | 2.96 | 600 |
| Paradichlorobenzene | 424 | 29 | 1.46 | 290 |
| Carbowax 20M | 96 | 8 | 1.20 | 80 |
| Zinc Stearate | 33 | 3 | 1.09 | 30 |

* The glass-ceramic material recited in Example II.

Cores made from that batch were fired for 8 hours at a temperature of 1,200°C. to yield bodies consisting essentially of the pollucite glass-ceramic material demonstrating a coefficient of thermal expansion of about 48 $\times 10^{-7}$/°C. (25°–1,000°C.). The average strength of the cores was measured as about 3,200 psi and the average shrinkage about 0.8 percent. The cobalt-based superalloy referred to in Example I was cast on these cores at 1,600°C. with no chemical or physical injury being observed. Nevertheless, complete leaching of the core material was not accomplished even after a 48-hour immersion in a static bath of molten NaOh at 950°F.

EXAMPLE V

The Batch Composition

| Component | Weight in Grams | Percent by Volume | Density g/cc. | Vol. cc. |
| --- | --- | --- | --- | --- |
| Pollucite Mineral | 385 | 11.1 | 3.2 | 120 |
| Pollucite Glass-Ceramic* | 1540 | 56.7 | 2.5 | 615 |
| Paradichlorobenzene | 342 | 21.5 | 1.46 | 234 |
| Carbowax 20M | 91 | 7.0 | 1.20 | 76 |
| Fish Oil | 36 | 3.6 | 0.92 | 39 |

*The glass-ceramic material referred to in Example II.

Cores formed from that batch were "flash-fired;" that is, the green bodies were plunged directly into a furnace operating at the desired firing temperature and held thereat for no more than about one hour. In this specific instance, the cores were flash-fired for one-half hour at 1,240°C. to produce bodies exhibiting an average modulus of rupture of about 5,050 psi, an average shrinkage of 1.65 percent, and a coefficient of thermal expansion of 51 $\times 10^{-7}$/°C. (25°–1,000°C.).

When a nickel-based superalloy having a coefficient of thermal expansion of about 172 $\times 10^{-7}$/°C. (0°–1093°C.) and the approximate composition listed below in weight percent

| | |
| --- | --- |
| Cr | 11.9% |
| Ni | 75.0 |
| Ta | 1.8 |
| C | 0.06 |
| Zr | 0.12 |
| Ti | 0.45 |
| Al | 5.9 |
| Mo | 4.3 | was cast on these cores at 1,600°C., no chemical reaction or physical degradation was evidenced. However, the core body was not completely removed even after a static immersion of 24 hours in molten NaOH at 950°C.

Example VI

The Batch Composition

| Component | Weight in Grams | Percent by Volume | Density g/cc. | Vol. cc. |
| --- | --- | --- | --- | --- |
| Pollucite Mineral | 71.1 | 3.2 | 2.90 | 24.5 |
| Mullite Glass-Ceramic* | 1300.0 | 58.5 | 2.96 | 439.0 |
| "Mullite" Glass** | 72.7 | 3.3 | 2.95 | 24.5 |
| Paradichlorobenzene | 275.0 | 25.0 | 1.46 | 188.0 |
| Carbowax 20M | 72.0 | 8.0 | 1.20 | 60.0 |
| Fish Oil | 13.8 | 2.0 | 0.92 | 15.0 |

*A glass-ceramic material prepared in accordance with United States Application Serial No. 212,985, supra, wherein the crystal phase consists essentially of mullite and a minor amount of cubic zirconia made through the crystallization *in situ* of a glass consisting essentially, by weight, of 39% $SiO_2$, 34% $Al_2O_3$, 12% $Cs_2O$, and 15% $ZrO_2$.
** The glass noted above consisting of 39% $SiO_2$, 34% $Al_2O_3$, 12% $Cs_2O$, and 15% $ZrO_2$ which can be crystallized *in situ* to a glass-ceramic wherein the crystal phase consists essentially of mullite and a minor amount of cubic zirconia.

Cores made from that batch were fired in accordance with several schedules to yield sintered bodies exhibiting the following physical properties:

| | Firing Schedule | Shrinkage | Modulus of Rupture |
| --- | --- | --- | --- |
| (1) | Heat at 300°C./hour to 1240°C. Hold for 4 hours | 0.55% | 2870 psi |
| (2) | Heat at 300°C./hour to 1520°C. Hold for 4 hours | 0.50% | 2990 psi |
| (3) | Flash fired at 1525°C. for 1 hr. | 0.81% | — |
| (4) | Flash fired at 1600°C. for 1 hr. | 0.83% | 3690 psi |

The bodies demonstrated a coefficient of thermal expansion of about 48 $\times 10^{-7}$/°C. (25°–1,000°C.).

After pouring the same cobalt base superalloy as that employed in Example I at 1,505°C., no chemical or physical attack of the core material was observed. However, leaching of the core by NaOh was very slow, i.e., complete removal of the core was not accomplished after 12½ hours in a 20 percent aqueous solution of NaOH maintained at a temperature of about 100°C.

It is believed apparent from an examination of the foregoing examples that preform cores exhibiting sufficient refractoriness, strength, and compatibility with molten metal at temperatures of 1,600°C. and higher can be produced from materials containing pollucite and/or mullite crystals. Also, the coefficient of thermal expansion falls within the 30–60 $\times 10^{-7}$/°C. range which is compatible with the process presently being utilized in the manufacture of jet engine blades and vanes from the cobalt and nickel based superalloys.

Yet, the slow rate at which the pollucite and/or mullite-containing materials and, particularly, the glass-ceramic products containing those crystal phases leach in non-acid solvents has led to the addition of the more readily-soluble silica to the initial batch. Thus, even where the leachant has been agitated or moved in contact with the core materials as, for example, by ultrasonic vibration, the time necessary for core removal has not been reduced to that which the presence of even a small amount of silica will accomplish. Therefore, at the sacrifice of highest refractoriness, the preferred embodiment of the invention contemplates the addition of silica.

We claim:

1. A preform core body capable of withstanding contact with molten metal at temperatures of about 1,600°C., exhibiting a modulus of rupture of at least 2,000 psi, capable of being leached in from about 12 to about 48 hours, when immersed in molten alkali, having a coefficient of thermal expansion ranging between about 30–60 × $10^{-7}$/°C., and being relatively inert to nickel and cobalt base superalloys comprising a sintered body consisting essentially of at least one $Cs_2O$-containing material selected from the group consisting of pollucite mineral, a glass-ceramic consisting essentially, by weight, of >15% but <40% $Cs_2O$, >10% but <55% $Al_2O_3$, and >25% but <75% $SiO_2$, wherein the crystal phase thereof consists essentially of pollucite, and a glass-ceramic consisting essentially, by weight of >4% but <15% $Cs_2O$, >15% but <35% $Al_2O_3$, and >35% but <80% $SiO_2$, wherein the crystal phase thereof consists essentially of mullite.

2. A preform core body capable of withstanding contact with molten metal at temperatures up to 1,600°C., exhibiting a modulus of rupture of at least 2,000 psi, demonstrating ready leaching when immersed in molten alkali, having a coefficient of thermal expansion ranging between about 30–60 × $10^{-7}$/°C., and being relatively inert to nickel and cobalt base superalloys comprising a sintered body consisting essentially, by weight, of 10–80 percent of a highly siliceous material selected from the group consisting of fused quartz, fused silica and silica glass in which there is at least 90 percent silica and 20-90 percent of at least one $Cs_2O$-containing material selected from the group consisting of pollucite mineral, a glass-ceramic consisting essentially, by weight, of >15% but <40% $Cs_2O$, >10% but <55% $Al_2O_3$, and >25% but <75% $SiO_2$, wherein the crystal phase thereof consists essentially of pollucite, and a glass-ceramic consisting essentially, by weight, of >4% but <15% $Cs_2O$, >15% but <35% $Al_2O_3$, and >35% but <80% $SiO_2$, wherein the crystal phase thereof consists essentially of mullite.

* * * * *